(12) United States Patent
Chu et al.

(10) Patent No.: US 11,713,843 B2
(45) Date of Patent: Aug. 1, 2023

(54) STAND ADJUSTMENT DEVICE

(71) Applicant: Reliance International Corp., Taipei (TW)

(72) Inventors: Pei-Chi Chu, Taipei (TW); Cheng-Lin Ho, Taipei (TW); Chi-Chia Huang, Taipei (TW); Wei-Ting Chen, Taipei (TW)

(73) Assignee: Reliance International Corp., Taipei (TW)

( * ) Notice: Subject to any disclaimer, the term of this patent is extended or adjusted under 35 U.S.C. 154(b) by 252 days.

(21) Appl. No.: 17/197,242

(22) Filed: Mar. 10, 2021

(65) Prior Publication Data

US 2022/0290799 A1 Sep. 15, 2022

(51) Int. Cl.
*F16M 11/10* (2006.01)
*G10G 5/00* (2006.01)
*F16M 11/24* (2006.01)
*F16M 11/38* (2006.01)

(52) U.S. Cl.
CPC ........... *F16M 11/10* (2013.01); *F16M 11/242* (2013.01); *F16M 11/38* (2013.01); *G10G 5/00* (2013.01); *F16M 2200/022* (2013.01)

(58) Field of Classification Search
USPC ......... 248/178.1, 179.1, 183.1, 183.2, 183.4, 248/186.1, 186.2, 176.3
See application file for complete search history.

(56) References Cited

U.S. PATENT DOCUMENTS

| | | | | |
|---|---|---|---|---|
| 4,431,329 | A * | 2/1984 | Baitelle | F16M 11/2007 403/55 |
| 5,449,138 | A * | 9/1995 | Ciancio | F21V 21/26 403/53 |
| 6,390,424 | B1 * | 5/2002 | Kidushim | F16M 11/24 248/404 |
| 2007/0231059 | A1 * | 10/2007 | Mullaney | A61B 17/60 403/52 |
| 2017/0347170 | A1 * | 11/2017 | Liao | F16M 11/2021 |

FOREIGN PATENT DOCUMENTS

TW  M469594 U  1/2014

\* cited by examiner

*Primary Examiner* — Alfred J Wujciak
(74) *Attorney, Agent, or Firm* — Alan D. Kamrath; Karin L. Williams; Mayer & Williams PC

(57) ABSTRACT

A stand adjustment device has a tripod-connecting member, a connecting seat, two clamping plates, a boom-connecting tube, a locking shaft, and a manual operating member. The connecting seat is rotatably located around the tripod-connecting member. The two clamping plates are detachably attached to two opposite sides of the connecting seat respectively. One end of the locking shaft is movably disposed in the boom-connecting tube. The boom is slidably mounted through the boom-connecting tube and the locking shaft. The locking shaft is slidably mounted through the boom-connecting tube, the two clamping plates, and the connecting seat such that the boom-connecting tube is rotatable relative to the connecting seat. The manual operating member and the locking shaft are configured to clamp the boom-connecting tube, the two clamping plates, and the connecting seat therebetween into a locked condition.

8 Claims, 15 Drawing Sheets

STAND ADJUSTMENT DEVICE

BACKGROUND OF THE INVENTION

1. Field of the Invention

The present invention relates to a stand on which an external object may be fixed, especially to an adjustment device, which allows position adjustment of the external object, of a stand. The stand can be a microphone stand, a musical instrument stand, or a speaker stand.

2. Description of the Prior Arts

With reference to FIG. 14 and FIG. 15, a conventional stand, such as a cymbal stand, has a cymbal connecting end 91 and multiple adjustment screws 92. Each one of the adjustment screws 92 corresponds to one rotational adjustment or one translational adjustment. For example, when a user needs to adjust height and an angle of a cymbal mounted on the stand simultaneously, two of the screws each corresponding to the height and the rotation respectively need to be loosened for the adjustment, and then said screws need to be tightened again to finish the adjustment.

However, the cymbal stand usually needs to be adjusted in multiple directions simultaneously. That is, the user needs to loosen multiple of the adjustment screws 92, which are disposed at different locations on the cymbal stand, and then tighten the adjustment screws 92 again in order to adjust position of the cymbal. Therefore, the conventional stand is inconvenient to use.

In addition, a conventional stand adjustment device is disclosed in TWM469594.

To overcome the shortcomings, the present invention provides a stand adjustment device to mitigate or obviate the aforementioned problems.

SUMMARY OF THE INVENTION

The main objective of the present invention is to provide a stand adjustment device that enables or disables adjustment in multiple directions via operating one manual operating element for ease of use.

The stand adjustment device is configured to be assembled into a stand with a tripod and a boom. The stand adjustment device of a first configuration has a tripod-connecting member, a connecting seat, a proximal clamping plate, a distal clamping plate, a boom-connecting tube, a locking shaft, and a manual operating member. The tripod-connecting member is cylindrical and is configured to be connected to the tripod. The tripod-connecting member has a seat positioning portion formed around an outer annular surface of the tripod-connecting member. The connecting seat is rotatably located around the seat positioning portion of the tripod-connecting member and has a first side and a second side that are disposed opposite each other. The proximal clamping plate is detachably attached to the first side of the connecting seat and has a first lateral surface, a second lateral surface, a proximal positioning portion and an inner positioning portion. The proximal positioning portion is formed on the first lateral surface. The proximal positioning portion is detachably abutting against the seat positioning portion of the tripod-connecting member. The inner positioning portion is formed on the second lateral surface. The distal clamping plate is detachably attached to the second side of the connecting seat and has a distal positioning portion. The distal positioning portion is formed on a surface, which faces toward the connecting seat, of the distal clamping plate. The distal positioning portion detachably abuts against the seat positioning portion of the tripod-connecting member. The boom-connecting tube is detachably attached to the proximal clamping plate and is rotatable relative to the connecting seat. A rotating axis of the boom-connecting tube relative to the connecting seat is non-parallel to a rotating axis of the connecting seat relative to the tripod-connecting member. The boom-connecting tube has two outer clamping holes and an outer positioning portion. The two outer clamping holes are each formed through a respective one of two opposite sides of the boom-connecting tube. The outer positioning portion is disposed on a side, which faces toward the connecting seat, of the boom-connecting tube. The outer positioning portion detachably engages with the inner positioning portion of the proximal clamping plate. The locking shaft is slidably and sequentially mounted through the boom-connecting tube, the proximal clamping plate, the connecting seat, and the distal clamping plate such that the boom-connecting tube is rotatable relative to the connecting seat. The locking shaft has a first end, a second end, a shaft abutting portion, and an inner clamping hole. The first end and the second end are disposed opposite each other. The shaft abutting portion is formed on the first end and movably disposed in the boom-connecting tube. The inner clamping hole is formed through the shaft abutting portion. The boom is slidably mounted through the two outer clamping holes of the boom-connecting tube and the inner clamping hole of the locking shaft. The manual operating member is connected to the second end of the locking shaft and has a manual abutting portion. The manual abutting portion is configured to move toward or away from the shaft abutting portion of the locking shaft. The manual abutting portion of the manual operating member and the shaft abutting portion of the locking shaft are configured to clamp the boom-connecting tube, the proximal clamping plate, the connecting seat, and the distal clamping plate therebetween into a locked condition. In the locked condition, a wall of the inner clamping hole of the locking shaft abuts against a far side of the boom, and walls of the two outer clamping holes of the boom-connecting tube abut against a near side of the boom to prevent the boom from sliding relative to the boom-connecting tube. In the locked condition, the outer positioning portion of the boom-connecting tube engages with the inner positioning portion of the proximal clamping plate to prevent the boom-connecting tube from rotating relative to the connecting seat. In the locked condition, the seat positioning portion of the tripod-connecting member is clamped between the proximal positioning portion of the proximal clamping plate and the distal positioning portion of the distal clamping plate to prevent the connecting seat from rotating relative to the tripod-connecting member.

The stand adjustment device of a second configuration has a tripod-connecting member, a connecting seat, a distal clamping plate, a boom-connecting tube, a locking shaft, and a manual operating member. The tripod-connecting member is cylindrical and is configured to be connected to the tripod. The tripod-connecting member has a seat positioning portion formed around an outer annular surface of the tripod-connecting member. The connecting seat is rotatably located around the seat positioning portion of the tripod-connecting member and has a first side and a second side that are disposed opposite each other. The inner positioning portion is formed on the first side. The distal clamping plate is detachably attached to the second side of the connecting seat and has a distal positioning portion. The distal positioning portion is formed on a surface, which faces toward the connecting seat, of the distal clamping plate. The distal positioning portion detachably abuts against the seat positioning portion of the tripod-connecting member. The boom-connecting tube is detachably attached to the first side of the connecting seat and is rotatable relative to the connecting seat. A rotating axis of the boom-connecting tube relative to the connecting seat is non-parallel to a rotating axis of the connecting seat relative to the tripod-connecting member. The boom-connecting tube has two outer clamping holes and an outer positioning portion. The two clamping holes are each formed through a respective one of two opposite sides of the boom-connecting tube. The outer positioning portion is disposed on a side, which faces toward the connecting seat, of the boom-connecting tube. The outer positioning portion detachably engages with the inner positioning portion of the connecting seat. The locking shaft is slidably and sequentially mounted through the boom-connecting tube, the connecting seat, and the distal clamping plate such that the boom-connecting tube is rotatable relative to the connecting seat. The locking shaft has a first end, a second end, a shaft abutting portion, and an inner clamping hole. The first end and the second end are disposed opposite each other. The shaft abutting portion is formed on the first end and movably disposed in the boom-connecting tube. The inner clamping hole is formed through the shaft abutting portion. The boom is slidably mounted through the two outer clamping holes of the boom-connecting tube and the inner clamping hole of the locking shaft. The manual operating member is connected to the second end of the locking shaft and has a manual abutting portion. The manual abutting portion is configured to move toward or away from the shaft abutting portion of the locking shaft. The manual abutting portion of the manual operating member and the shaft abutting portion of the locking shaft are configured to clamp the boom-connecting tube, the connecting seat, and the distal clamping plate therebetween into a locked condition. In the locked condition, a wall of the inner clamping hole of the locking shaft abuts against a far side of the boom, and walls of the two outer clamping holes of the boom-connecting tube abut against a near side of the boom to prevent the boom from sliding relative to the boom-connecting tube. In the locked condition, the outer positioning portion of the boom-connecting tube engages with the inner positioning portion of the connecting seat to prevent the boom-connecting tube from rotating relative to the connecting seat. In the locked condition, the seat positioning portion of the tripod-connecting member is clamped between an inner surface of the connecting seat and the distal positioning portion of the distal clamping plate to prevent the connecting seat from rotating relative to the tripod-connecting member.

The stand adjustment device of a third configuration has a tripod-connecting member, a connecting seat, a proximal clamping plate, a boom-connecting tube, a locking shaft, and a manual operating member. The tripod-connecting member is cylindrical and is configured to be connected to the tripod. The tripod-connecting member has a seat positioning portion formed around an outer annular surface of the tripod-connecting member. The connecting seat is rotatably located around the seat positioning portion of the tripod-connecting member and has a first side and a second side that are disposed opposite each other. The proximal clamping plate is detachably attached to the first side of the connecting seat and has a first lateral surface, a second lateral surface, a proximal positioning portion and an inner positioning portion. The proximal positioning portion is formed on the first lateral surface. The proximal positioning portion detachably abuts against the seat positioning portion of the tripod-connecting member. The inner positioning portion is formed on the second lateral surface. The boom-connecting tube is detachably attached to the proximal clamping plate and is rotatable relative to the connecting seat. A rotating axis of the boom-connecting tube relative to the connecting seat is non-parallel to a rotating axis of the connecting seat relative to the tripod-connecting member. The boom-connecting tube has two outer clamping holes and an outer positioning portion. The two outer clamping holes each formed through a respective one of two opposite sides of the boom-connecting tube. The outer positioning portion is disposed on a side, which faces toward the connecting seat, of the boom-connecting tube. The outer positioning portion detachably engages with the inner positioning portion of the proximal clamping plate. The locking shaft is slidably and sequentially mounted through the boom-connecting tube, the proximal clamping plate and the connecting seat such that the boom-connecting tube is rotatable relative to the connecting seat. The locking shaft has a first end, a second end, a shaft abutting portion, and an inner clamping hole. The first end and the second end are disposed opposite each other. The shaft abutting portion is formed on the first end and movably disposed in the boom-connecting tube. The inner clamping hole is formed through the shaft abutting portion. The boom is slidably mounted through the two outer clamping holes of the boom-connecting tube and the inner clamping hole of the locking shaft. The manual operating member is connected to the second end of the locking shaft and has a manual abutting portion. The manual abutting portion is configured to move toward or away from the shaft abutting portion of the locking shaft. The manual abutting portion of the manual operating member and the shaft abutting portion of the locking shaft are configured to clamp the boom-connecting tube, the proximal clamping plate, and the connecting seat therebetween into a locked condition. In the locked condition, a wall of the inner clamping hole of the locking shaft abuts against a far side of the boom, and walls of the two outer clamping holes of the boom-connecting tube abut against a near side of the boom to prevent the boom from sliding relative to the boom-connecting tube. In the locked condition, the outer positioning portion of the boom-connecting tube engages with the inner positioning portion of the proximal clamping plate to prevent the boom-connecting tube from rotating relative to the connecting seat. In the locked condition, the seat positioning portion of the tripod-connecting member is clamped between the proximal positioning portion of the proximal clamping plate and an inner surface of the connecting seat to prevent the connecting seat from rotating relative to the tripod-connecting member.

To use the present invention, mount a device, such as a microphone, to an end of the boom. A position of the boom can be adjusted in three different directions simultaneously such that the microphone, for example, can correspond in position to users with different heights or instruments that need to be recorded. Said three directions are respectively as follows:

1. The rotation of the connecting seat relative to the tripod-connecting member. Said rotation is generally on a horizontal plane.

2. The rotation of the boom-connecting tube relative to the connecting seat. Said rotation is generally on a vertical plane.

3. The sliding of the boom relative to the boom-connecting tube.

After adjustment, a user operates the manual operating member to clamp the boom-connecting tube, the proximal clamping plate, the connecting seat, and the distal clamping plate between the manual abutting portion of the manual operating member and the shaft abutting portion of the locking shaft to fix the position of the microphone in the adjusted position.

The advantage of the present invention is that one manual operating member is configured to enable or disable positional adjustment of the boom in three different directions simultaneously for ease of use.

Furthermore, in comparison with TWM469594, the present invention has the following advantages:

1. A bearing is mounted between the tripod-connecting member and the connecting seat to prevent the present invention from getting oblique in the vertical direction when the present invention is not in the locked condition.

2. The connecting seat is vertically supported by the tripod-connecting member to prevent the connecting seat from falling down. Therefore, the present invention is easier to use because the user does not have to hold the connecting seat when making adjustment.

3. The tripod-connecting member is compatible with standard tripods and standard booms. The user does not have to purchase a whole stand, thereby saving cost. The present invention can also be purchased by related industries to save research and development cost.

4. In the locked condition, there is no gap between the connecting seat, the proximal clamping plate, and the proximal clamping plate. As a result, the boom is firmly fixed, and an angle of the boom does not change when the manual operating member is being tightened.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
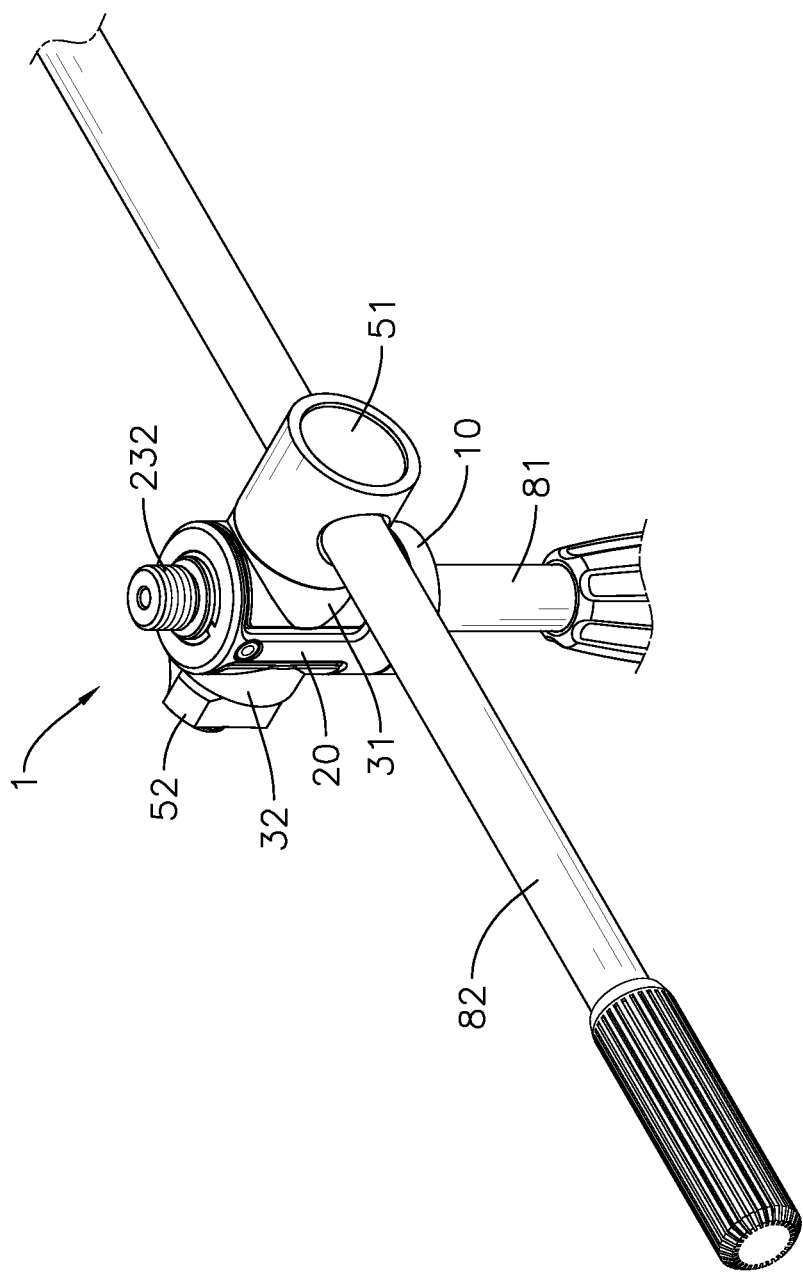
FIG. 1 is a perspective view of a stand adjustment device in accordance with the present invention.
Figure 2:
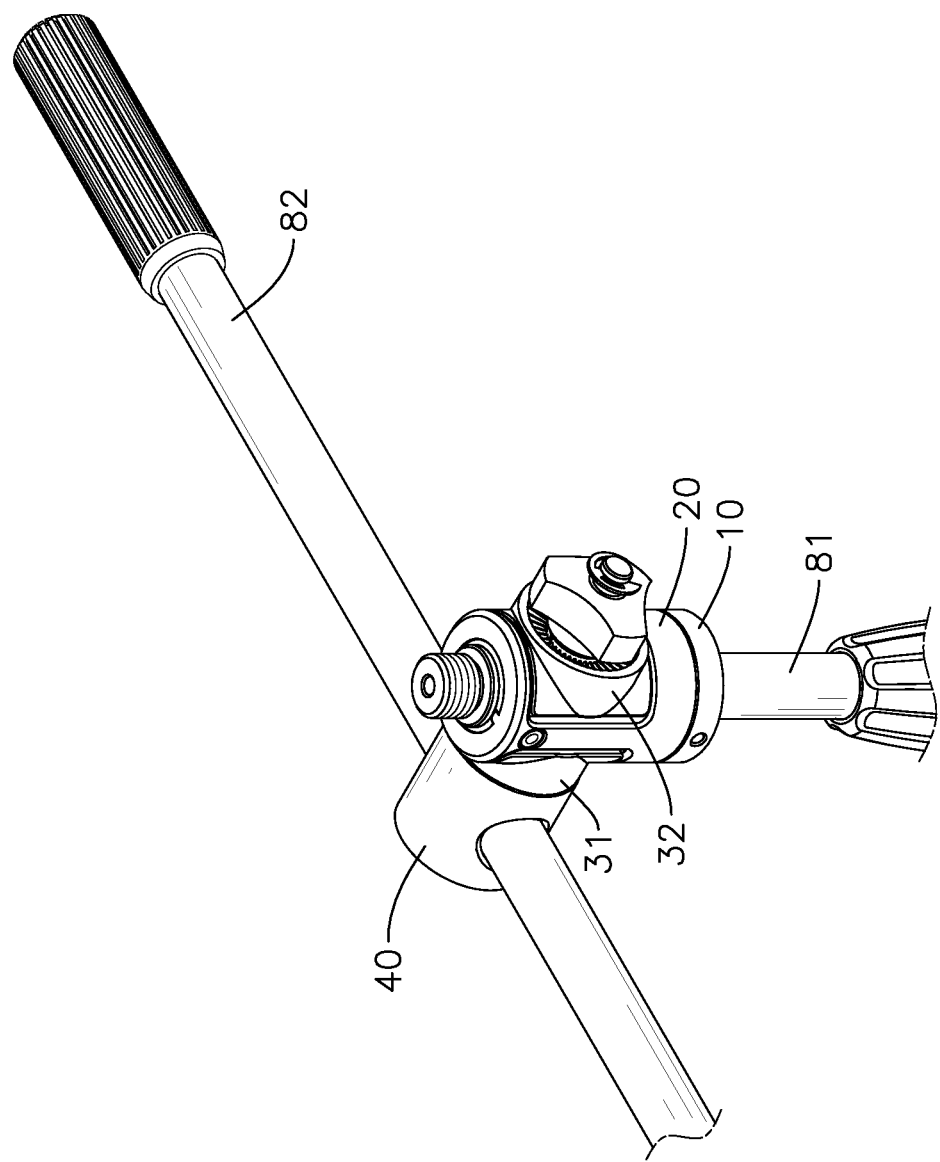
FIG. 2 is another perspective view of the stand adjustment device in FIG. 1.
Figure 3:
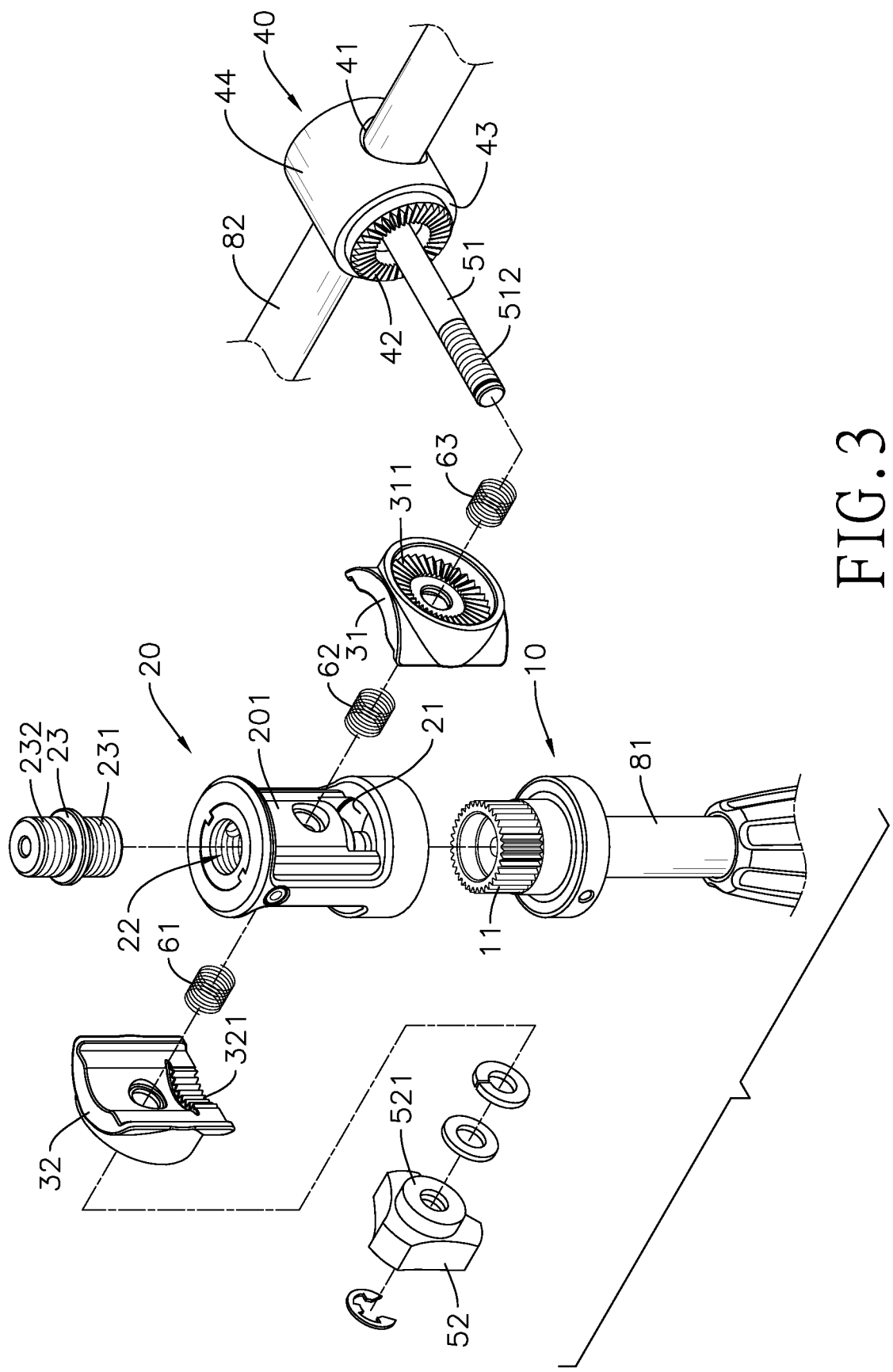
FIG. 3 is an exploded view of the stand adjustment device in FIG. 1.
Figure 8:
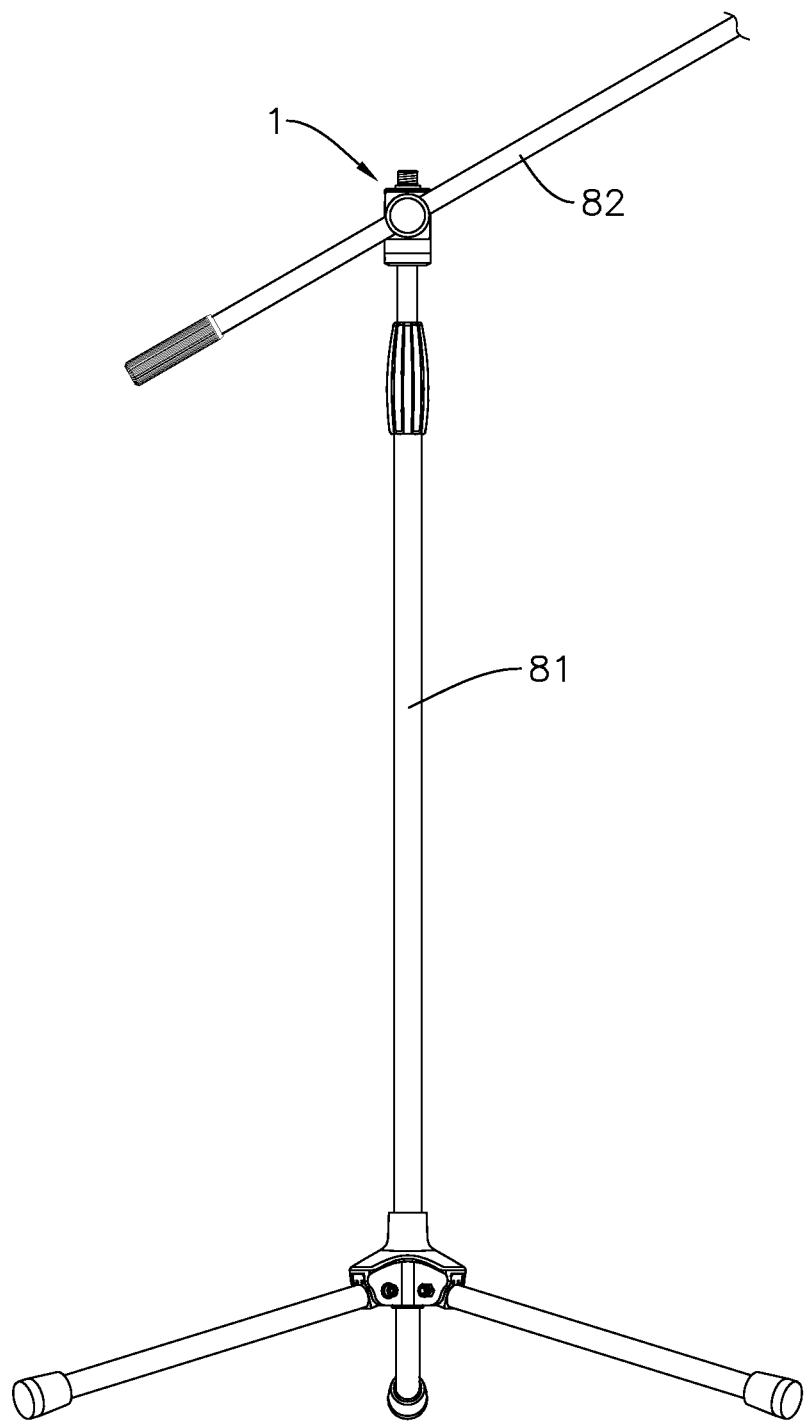
FIG. 8 and FIG. 9 are side views of the stand adjustment device, showing different operating statuses of the stand adjustment device.

With reference to FIGS. 1, 3, and 8, a first embodiment of the stand adjustment device 1 in accordance with the present invention is configured to be assembled into a stand with a tripod 81 and a boom 82. The stand can be any kind of stand that is used for fixing an external object. For example, the stand can be a microphone stand, a musical instrument stand or a speaker stand.

The stand adjustment device 1 has a tripod-connecting member 10, a connecting seat 20, a proximal clamping plate 31, a distal clamping plate 32, a boom-connecting tube 40, a locking shaft 51, and a manual operating member 52. In the preferred embodiment, the stand adjustment device 1 further has a distal resilient member 61, a proximal resilient member 62, and a tube resilient member 63.

The tripod-connecting member 10 is cylindrical and configured to be connected to the tripod 81. The tripod-connecting member 10 has a seat positioning portion 11 formed around an outer annular surface of the tripod-connecting member 10. In the preferred embodiment, the seat positioning portion 11 has multiple seat positioning gears. The seat positioning gears are arranged around the outer annular surface of the tripod-connecting member 10.

The connecting seat 20 is rotatably located around the seat positioning portion 11 of the tripod-connecting member 10 such that the connecting seat 20 is capable of rotating relative to the tripod 81. The rotation of the connecting seat 20 relative to the tripod-connecting member 10 is the first of three directions in which position of the boom 81 can be adjusted.

To be specific, a bottom round recess 21 is formed in a bottom surface of the connecting seat 20, and the bottom round recess 21 is located around the seat positioning portion 11 such that the connecting seat 20 is able to rotate around the seat positioning portion 11 of the tripod-connecting member 10. The connecting seat 20 has a first side 201 and a second side 202 that are disposed opposite each other.

In the preferred embodiment, the connecting seat 20 further has an expansion hole 22 and an expansion pole 23. The expansion hole 22 is formed in a top surface of the connecting seat 20. An internal thread is formed in the expansion hole 22. Two opposite ends of the expansion pole 23 are respectively a fixed end 231 and an expansion end 232. The fixed end 231 is screwed into the expansion hole 22. The expansion end 232 protrudes from the connecting seat 20, and an external thread is formed on the expansion end 232. Therefore, accessories can be connected to the top surface of the connecting seat 20 according to user needs. The expansion hole 22 is configured to be connected to an accessory with an external thread, and the expansion pole 23 is configured to be connected to an accessory with an internal thread. As a result the present invention is compatible with most accessories.

In this embodiment, an outer contour of the proximal clamping plate 31 is detachably attached to the first side 201 of the connecting seat 20. The proximal clamping plate 31 has a first lateral surface, a second lateral surface, an inner positioning portion 311 and a proximal positioning portion 312. The first lateral surface faces toward the connecting seat 20. The second lateral surface faces away from the connecting seat 20. The inner positioning portion 311 is formed on the second lateral surface. The proximal positioning portion 312 is formed on the first lateral surface. The proximal positioning portion detachably abuts against the seat positioning portion 11 of the tripod-connecting member 10. In the preferred embodiment, the proximal positioning portion 312 of the proximal clamping plate 31 comprises multiple proximal positioning gears arranged along a curve such that the proximal positioning gears can engage with the seat positioning gears.

The proximal resilient member 62 is disposed between the connecting seat 20 and the proximal clamping plate 31 such that the connecting seat 20 and the proximal clamping plate 31 are configured to move away from each other. To be precise, the proximal resilient member 62 is a compression spring.

The distal clamping plate 32 is detachably attached to the second side 202 of the connecting seat 20 and has a distal positioning portion 321. The distal positioning portion 321 is formed on a surface, which faces toward the connecting seat 20, of the distal clamping plate 32. In the preferred embodiment, the distal positioning portion 321 comprises multiple distal positioning gears arranged along a curve such that the distal positioning gears can engage with the seat positioning gears.

The distal resilient member 61 is disposed between the connecting seat 20 and the distal clamping plate 32 such that the connecting seat 20 and the distal clamping plate 32 are configured to move away from each other. To be precise, the distal resilient member 61 is a compression spring.

The boom-connecting tube 40 is detachably attached to the proximal clamping plate 31 and is rotatable relative to the connecting seat 20. The rotation of the boom-connecting tube 40 relative to the connecting seat 20 is the second of the three directions in which the position of the boom 81 can be adjusted.

A rotating axis of the boom-connecting tube 40 relative to the connecting seat 20 is non-parallel to a rotating axis of the connecting seat 20 relative to the tripod-connecting member 10. To be specific, the rotating axis of the boom-connecting tube 40 is perpendicular to the rotating axis of the connecting seat 20. That is, the rotation of the boom-connecting tube 40 relative to the connecting seat 20 is generally on a horizontal plane.

The boom-connecting tube 40 has two outer clamping holes 41 and an outer positioning portion 42. The two outer clamping holes 41 are each formed through a respective one of two opposite sides of the boom-connecting tube 40. The outer positioning portion 42 is disposed on a side, which faces toward the connecting seat 20, of the boom-connecting tube 40. The outer positioning portion 42 detachably engages with the inner positioning portion 311 of the proximal clamping plate 31.

The tube resilient member 63 is disposed between the boom-connecting tube 40 and the proximal clamping plate 31 such that the boom-connecting tube 40 and the proximal clamping plate 31 are configured to move away from each other. To be precise, the tube resilient member 63 is a compression spring.

Figure 4:
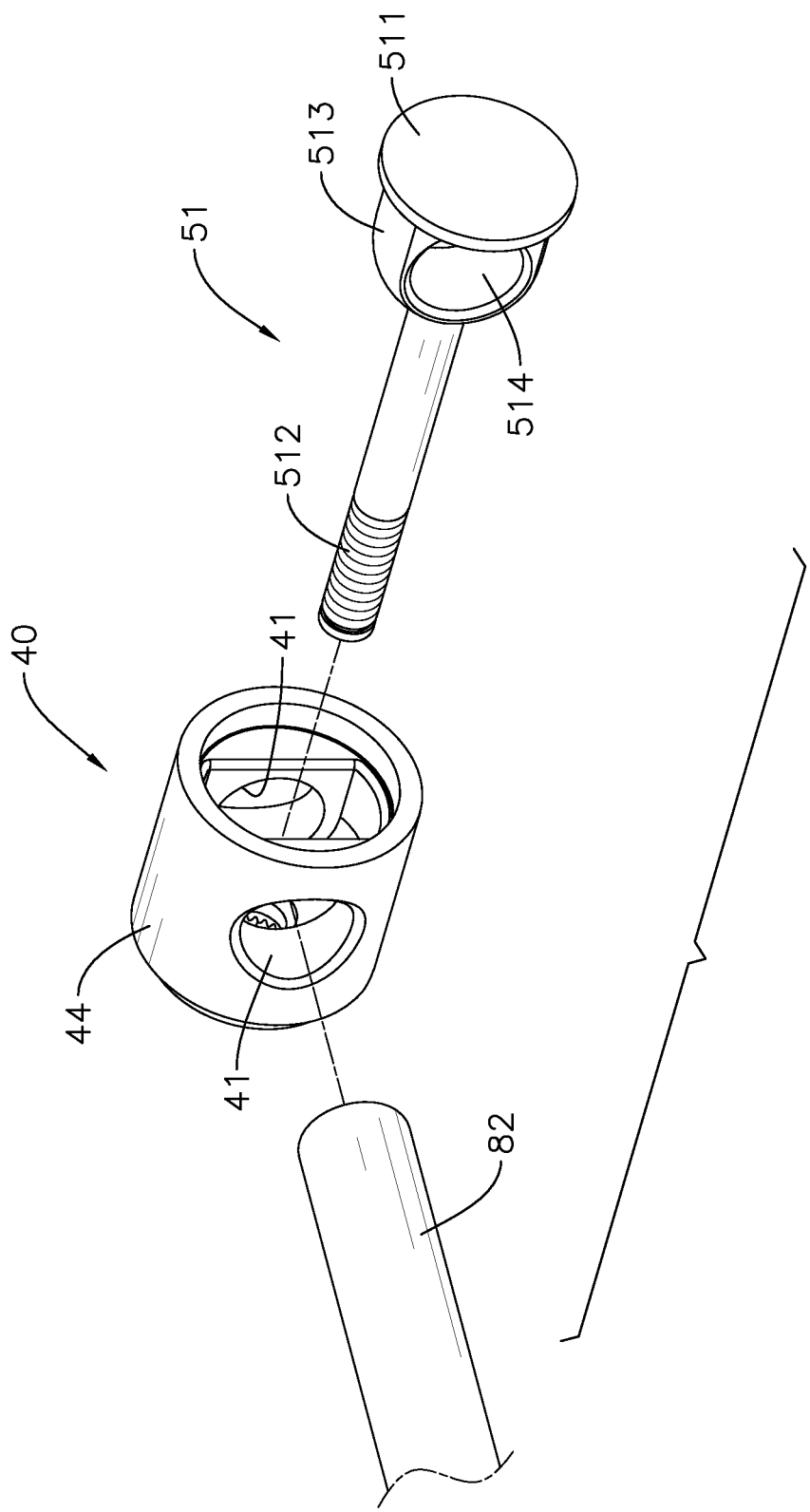
FIG. 4 is a partial exploded view of the stand adjustment device in FIG. 1.
Figure 5:
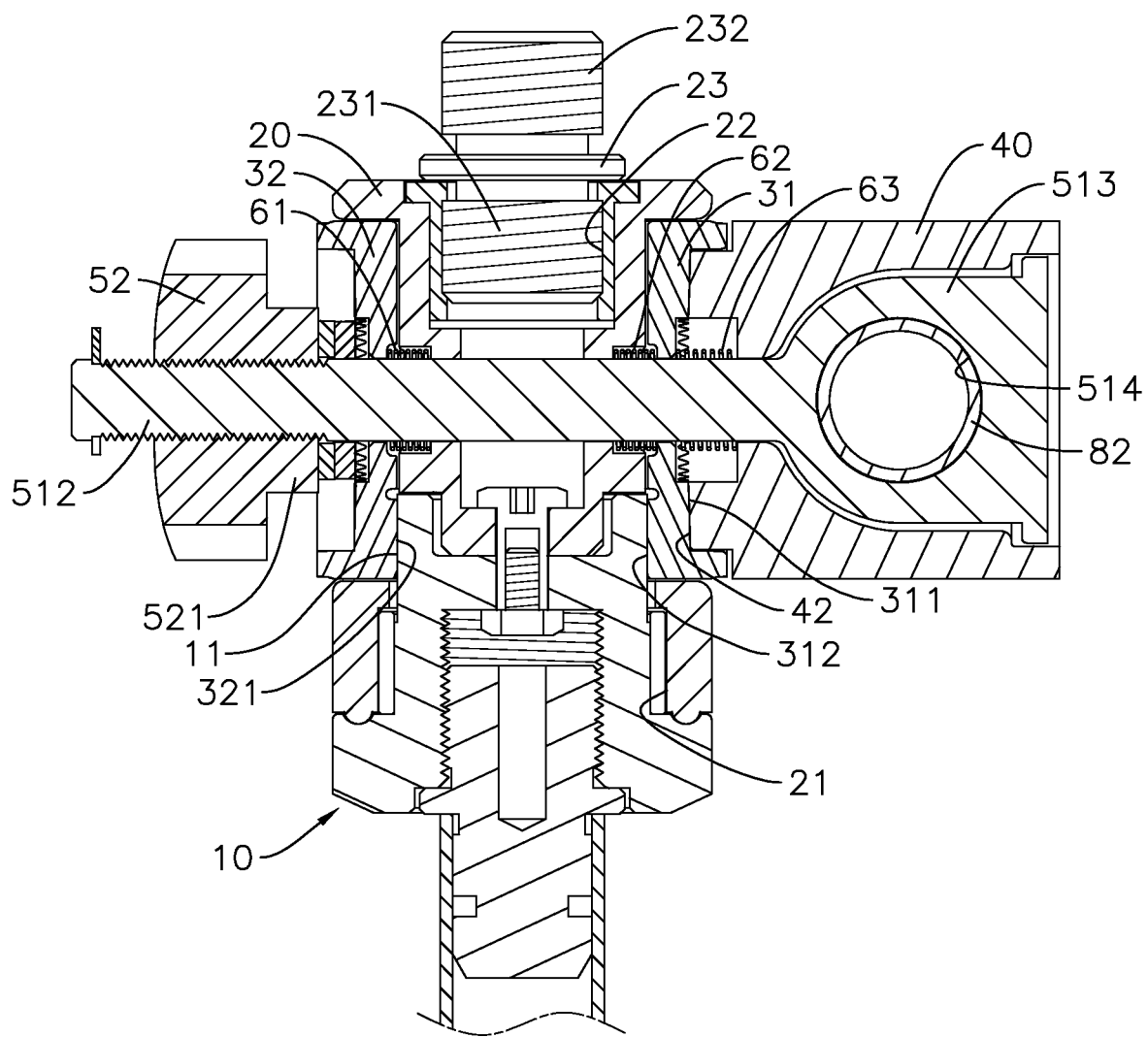
FIG. 5 is a partial longitudinal sectional view of the stand adjustment device in FIG. 1, showing inner positioning portions abutting against outer positioning portion in a locked condition.

With reference to FIGS. 3 to 5, the locking shaft 51 is slidably and sequentially mounted through the boom-connecting tube 40, the proximal clamping plate 31, the connecting seat 20, and the distal clamping plate 32 such that the boom-connecting tube 40 is rotatable relative to the connecting seat 40. The locking shaft 51 has a first end 511, a second end 512, a shaft abutting portion 513, and an inner clamping hole 514.

The first end 511 and the second end 512 are disposed opposite each other. The shaft abutting portion 513 is formed on the first end 511 and is movably disposed in the boom-connecting tube 40. The inner clamping hole 514 is formed through the shaft abutting portion 513. The boom 82 is slidably mounted through the two outer clamping holes 41 of the boom-connecting tube 40 and the inner clamping hole 514 of the locking shaft 51. The sliding of the boom 82 relative to the boom-connecting tube 40 is the third of the three directions in which the position of the boom 81 can be adjusted.

In the preferred embodiment, an outer contour of the shaft abutting portion 513 is non-circular, and is preferably in a shape of a racetrack. An inner surface of the boom-connecting tube 40 corresponds in shape to the outer contour of the shaft abutting portion 513 to prevent the locking shaft 51 from rotating relative to the boom-connecting tube 40 to keep openings of the outer clamping holes 41 and an opening of the inner clamping hole 514 substantially aligned before the boom 82 is installed. As a result, the boom 82 can be mounted through the locking shaft 51 and the boom-connecting tube 40 with ease.

In the preferred embodiment, the boom-connecting tube 40 has an end wall 43 and an annular wall 44. The outer positioning portion 42 is formed on the end wall 43 and is located on a side, which faces toward the connecting seat 20, of the end wall 43. The annular wall 44 is located around the shaft abutting portion 513 of the locking shaft 51. The two outer clamping holes 41 are formed through the annular wall 44 and are each located on a respective side of two opposite sides of the annular wall 44. The boom 82 is linearly mounted through the two outer clamping holes 41 and the inner clamping hole 514.

The manual operating member 52 is connected to the second end 512 of the locking shaft 51 and has a manual abutting portion 521. The manual abutting portion 521 is configured to move toward or away from the shaft abutting portion 513 of the locking shaft 51.

In the preferred embodiment, the manual operating member 52 is a knob bolt, and the manual abutting portion 521 is an end, which faces toward the shaft abutting portion 513, of the manual operating member 52. The manual operating member 52 is screwed onto the second end 512 of the locking shaft 51 such that a position of the manual abutting portion 521 can be changed by rotating the manual operating member 52. In another preferred embodiment, the manual operating member 52 can be a cam lever that uses a cam mechanism to adjust the position of the manual abutting portion 521.

Figure 6:
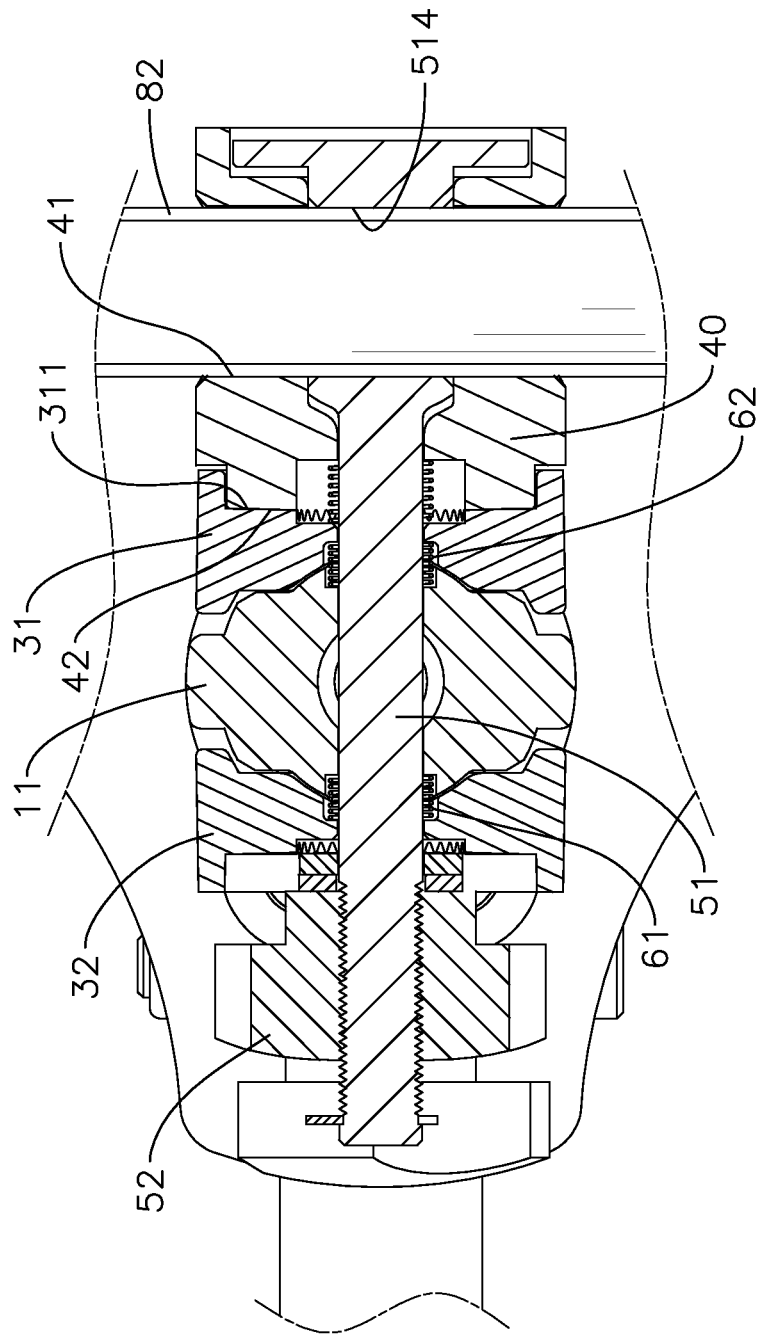
FIG. 6 is a partial cross sectional view of the stand adjustment device in FIG. 1, showing the stand adjustment device in the locked condition.
Figure 7:
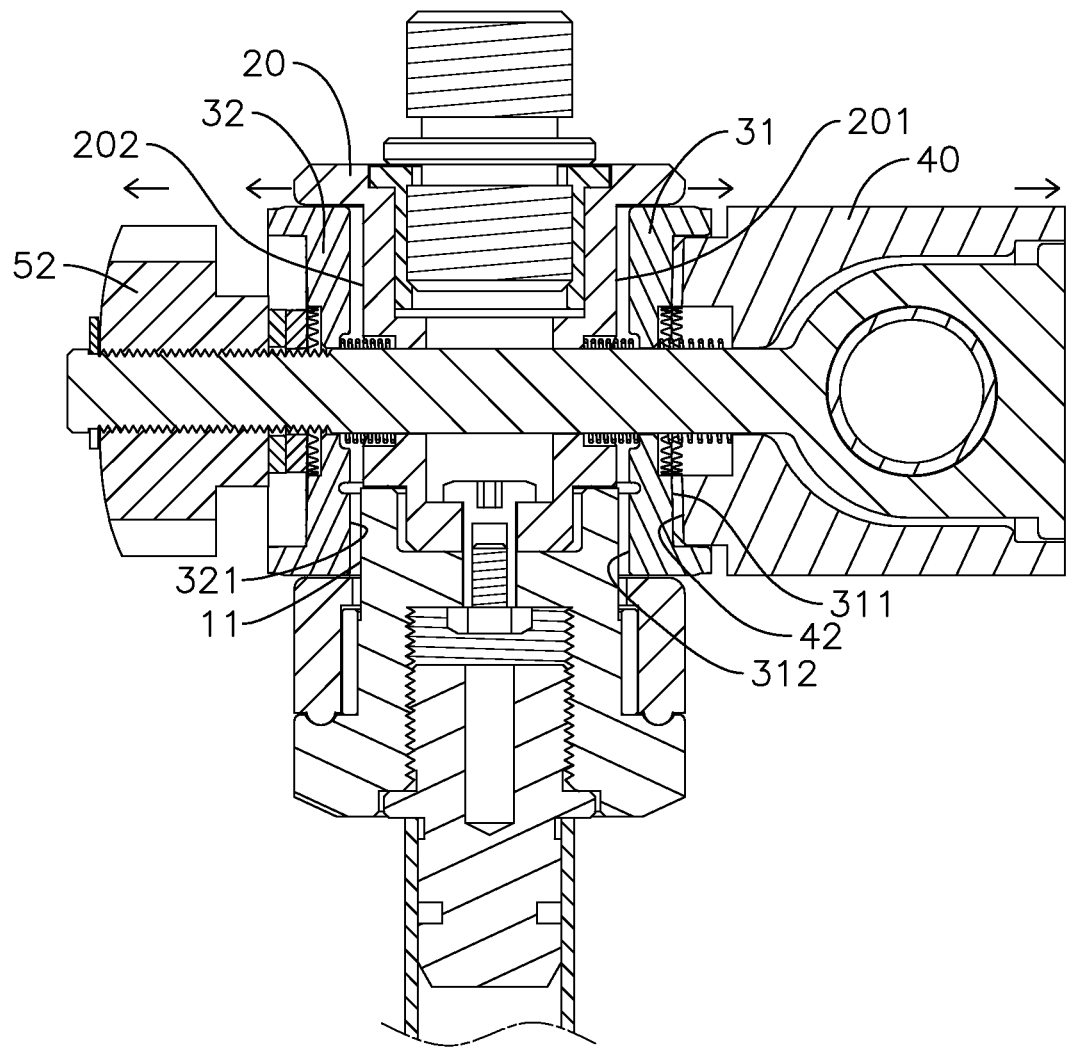
FIG. 7 is a partial longitudinal sectional view of the stand adjustment device in FIG. 1, showing the inner positioning portions detached from the outer positioning portions.

With reference to FIGS. 5 to 7, the manual abutting portion 521 of the manual operating member 52 is configured to move toward or away from the shaft abutting portion 513 of the locking shaft 51 such that the manual abutting portion 521 and the shaft abutting portion 513 are configured to clamp the boom-connecting tube 40, the proximal clamping plate 31, the connecting seat 20, and the distal clamping plate 32 therebetween into a locked condition. In the locked condition, adjustment of the position of the boom 81 in the three directions are locked simultaneously. Said three directions are as follows.

First, a wall of the inner clamping hole 514 of the locking shaft 51 abuts against a far side of the boom 82, and walls of the two outer clamping holes 41 of the boom-connecting tube 40 abut against a near side of the boom 82 to prevent the boom 82 from sliding relative to the boom-connecting tube 40.

Second, the outer positioning portion 42 of the boom-connecting tube 40 engages with the inner positioning portion 311 of the proximal clamping plate 31 to prevent the boom-connecting tube 40 from rotating relative to the connecting seat 20.

Third, the seat positioning portion 11 of the tripod-connecting member 10 is clamped between the proximal positioning portion 312 of the proximal clamping plate 31 and the distal positioning portion 321 of the distal clamping plate 32 to prevent the connecting seat 20 from rotating relative to the tripod-connecting member 10.

To use the present invention, mount a musical instrument or an audio equipment, such as a microphone, to an end of the boom 82, and loosen the audio equipment.

With reference to FIGS. 7 to 11, the boom-connecting tube 40, the connecting seat 20, the proximal clamping plate 31, and the distal clamping plate 32 are moved away from each other by the distal resilient member 61, the proximal resilient member 62, and the tube resilient member 63 (as shown in FIG. 7).

Figure 9:
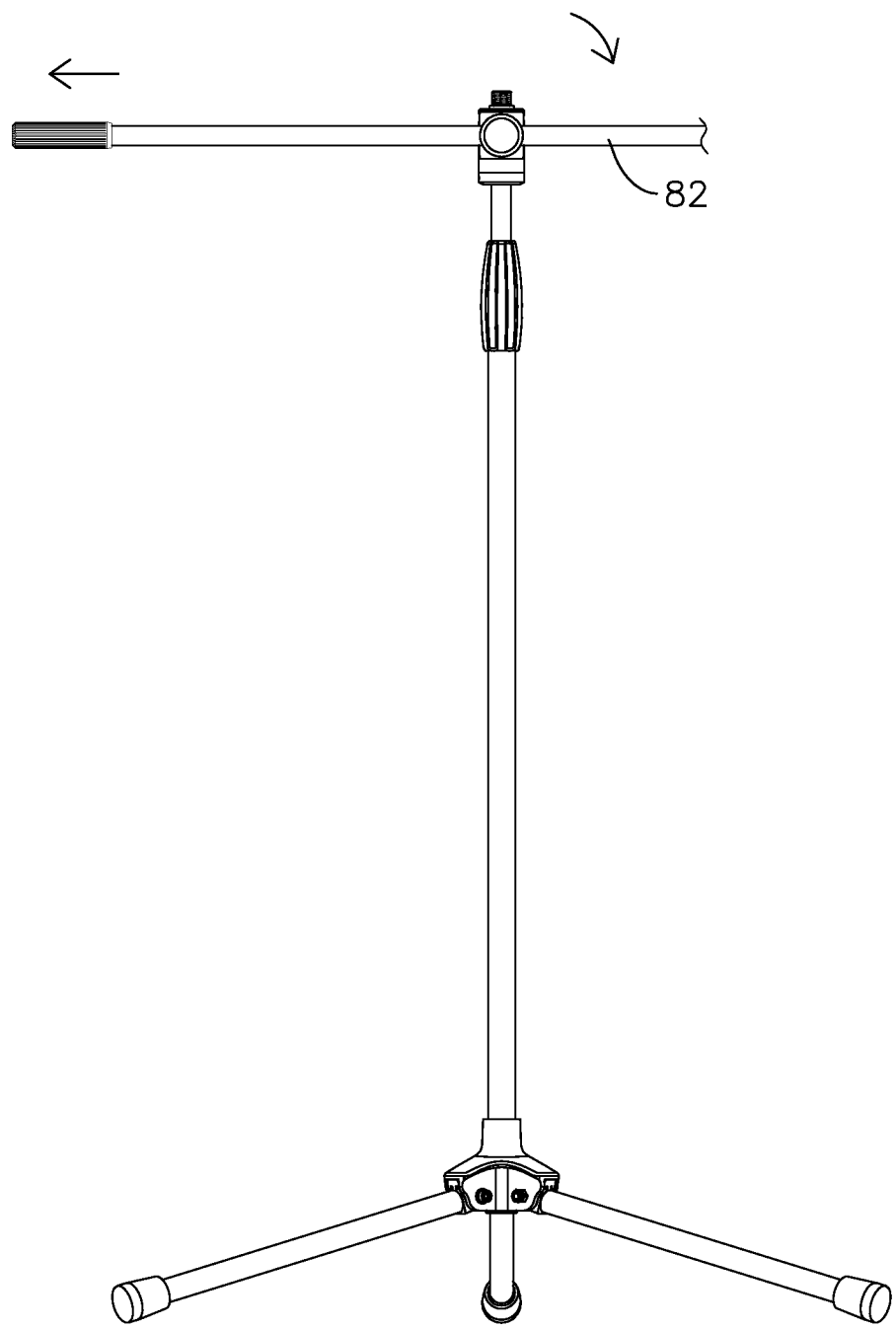
Figure 10:
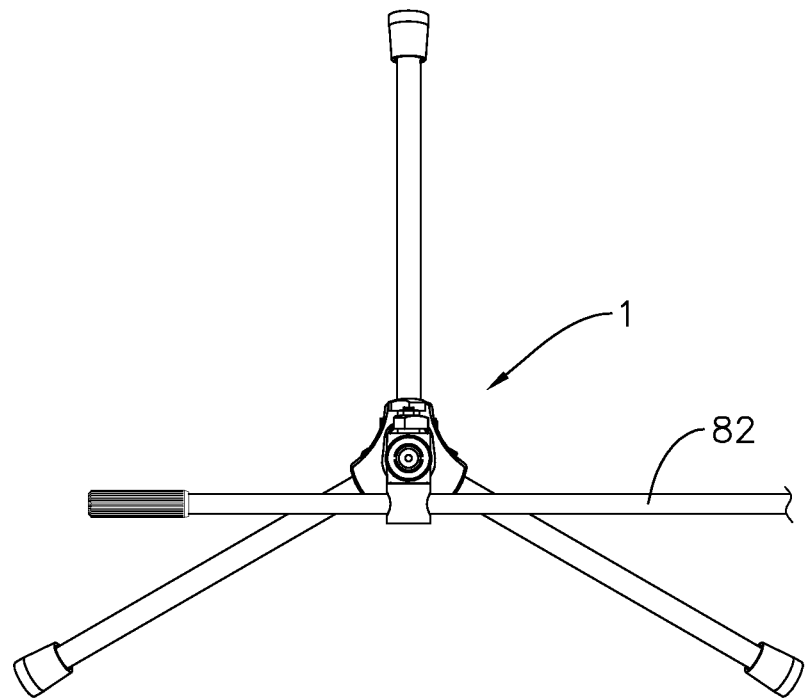
FIG. 10 and FIG. 11 are top views of the stand adjustment, showing different operating statuses of the stand adjustment device.
Figure 11:
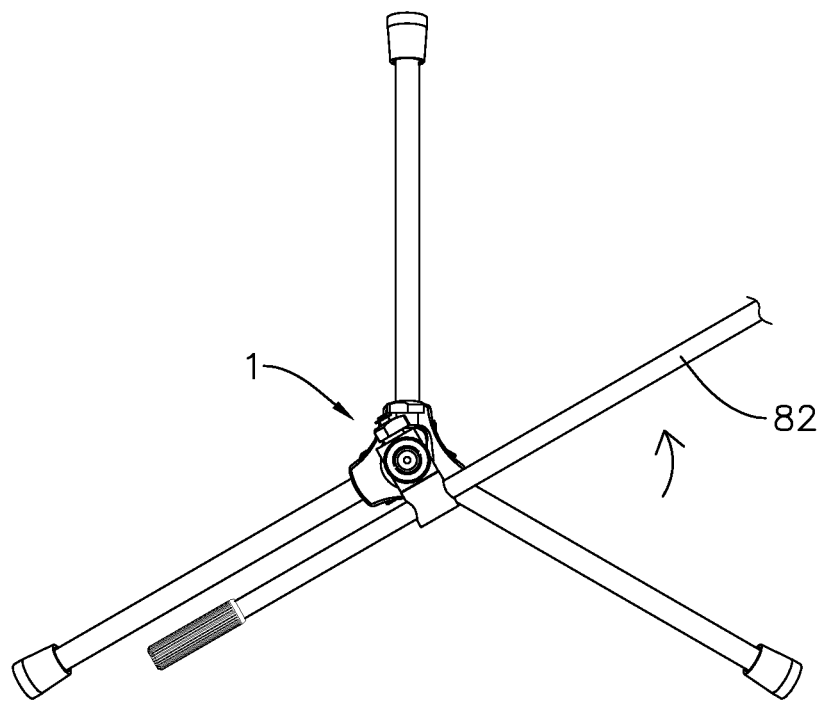

The boom 82 can rotate relative to the connecting seat 20 around a centerline of the locking shaft 51. The boom 82 can also slide relative to the boom-connecting tube 40 and the locking shaft 51 along a straight line (as shown in FIG. 8 and FIG. 9). Meanwhile the connecting seat 20 can rotate relative to the tripod 81 (as shown in FIG. 10 and FIG. 11). As a result, the boom 82 can be adjusted in two rotating directions and one linear moving direction, which allows the user to adjust position of the boom 82 in three different directions simultaneously to adjust position of the microphone according to users with different heights or instruments that need to be recorded.

After adjustment, tighten the manual operating member 52 so that the present invention is in the locked condition. The microphone is now fixed in the adjusted position.

The present invention also has the following structural features and advantages.

First, the outer positioning portion 42 of the boom-connecting tube 40 has multiple outer positioning gears arranged around the locking shaft 51. The inner positioning portion 311 of the proximal clamping plate 31 comprises multiple inner positioning gears arranged around the locking shaft 51 such that the outer positioning portion 42 firmly engages with the inner positioning portion 311.

Second, the proximal positioning portion 312 of the proximal clamping plate 31, the distal positioning portion 321 of the distal clamping plate 32, and the seat positioning portion 11 of the tripod-connecting member 10 each have multiple positioning gears. As a result, the proximal positioning portion 312 and the distal positioning portion 321 firmly engage with the seat positioning portion 11 to ensure that the connecting seat 20 cannot rotate relative to the tripod-connecting member 10. However, in another preferred embodiment, the proximal positioning portion 312, the distal positioning portion 321, and the seat positioning portion 11 can be made of material with high friction coefficient, such as rubber.

Third, by having the distal resilient member 61, the proximal resilient member 62, and the tube resilient member 63, the positioning gears are moved away and disengage from each other when the manual abutting portion 521 of the manual operating member 52 is moved away from the shaft abutting portion 513 of the manual abutting portion 521. As a result, the position of the boom 82 can be adjusted with ease.

Figure 12:
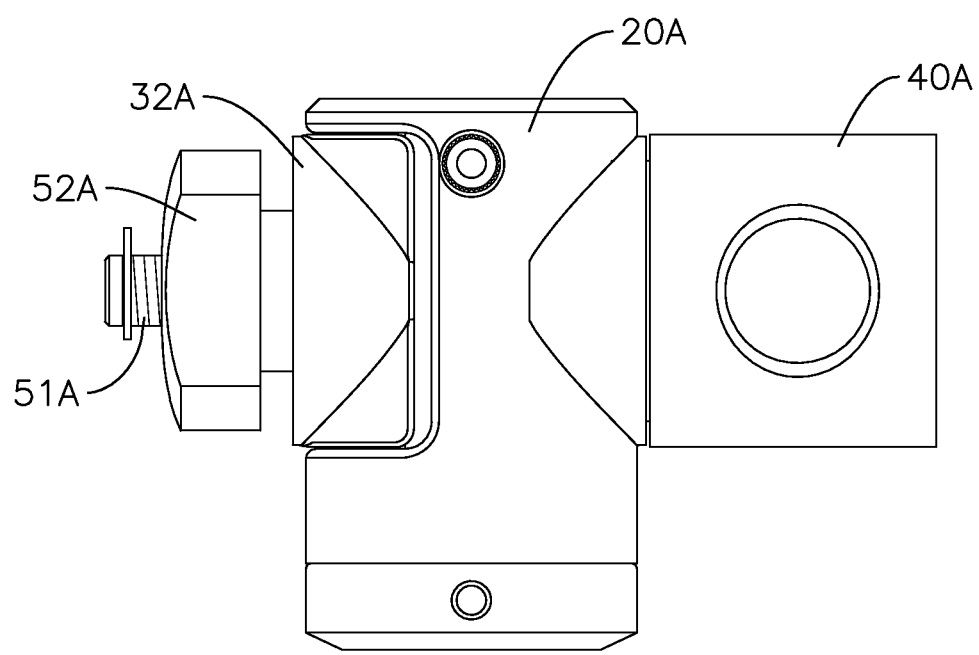
FIG. 12 is a side view of a second embodiment of the stand adjustment device.

With reference to FIG. 12, a second embodiment in accordance with the present invention is substantially similar to the first embodiment, but the difference is that the proximal clamping plate 31 is omitted, and the inner positioning portion 311 is formed on the first side of the connecting seat 20A instead. The manual abutting portion of the manual operating member 52A and the shaft abutting portion of the locking shaft 51A are configured to clamp the boom-connecting tube 40A, the connecting seat 20, and the distal clamping plate 32A therebetween into the locked condition.

In the locked condition, the outer positioning portion of the boom-connecting tube 40A engages with the inner positioning portion of the connecting seat 20A to prevent the boom-connecting tube 40A from rotating relative to the connecting seat 20A. Meanwhile, the seat positioning portion of the tripod-connecting member is clamped between an inner surface of the connecting seat 20A and the distal clamping plate 32A to prevent the connecting seat 20A from rotating relative to the tripod-connecting member 10.

Figure 13:
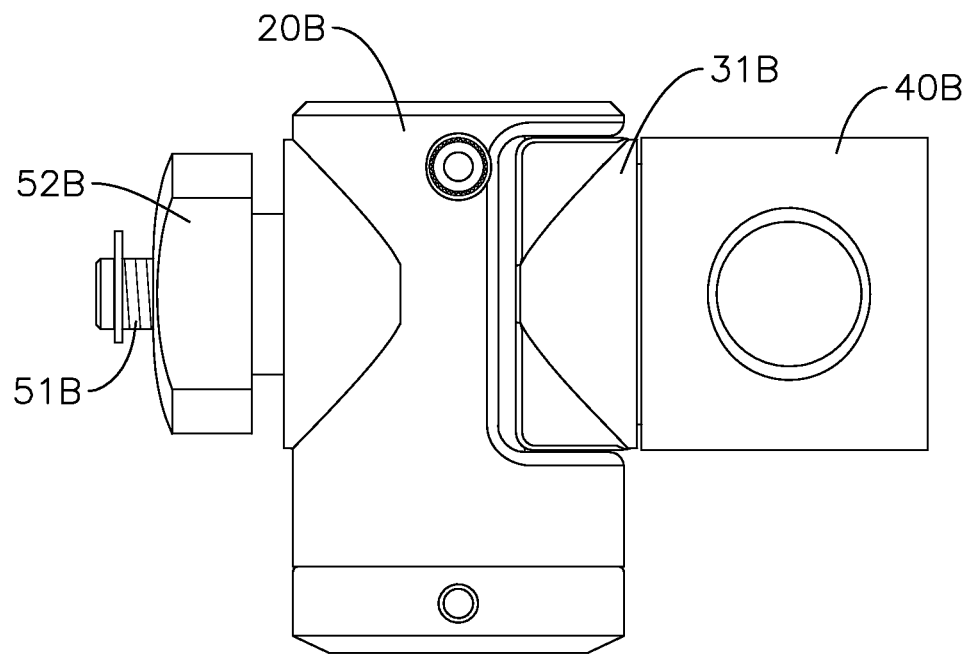
FIG. 13 is a side view of a third embodiment of the stand adjustment device.
Figure 14:
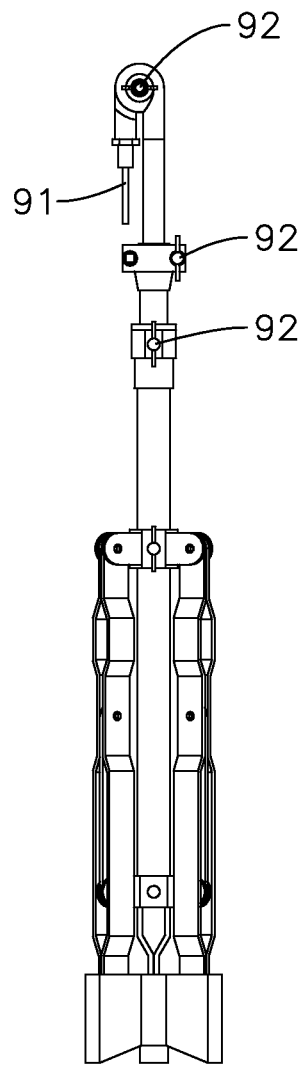
FIG. 14 and FIG. 15 are side views of a conventional cymbal stand, showing different operating statuses of the cymbal stand.
Figure 15:
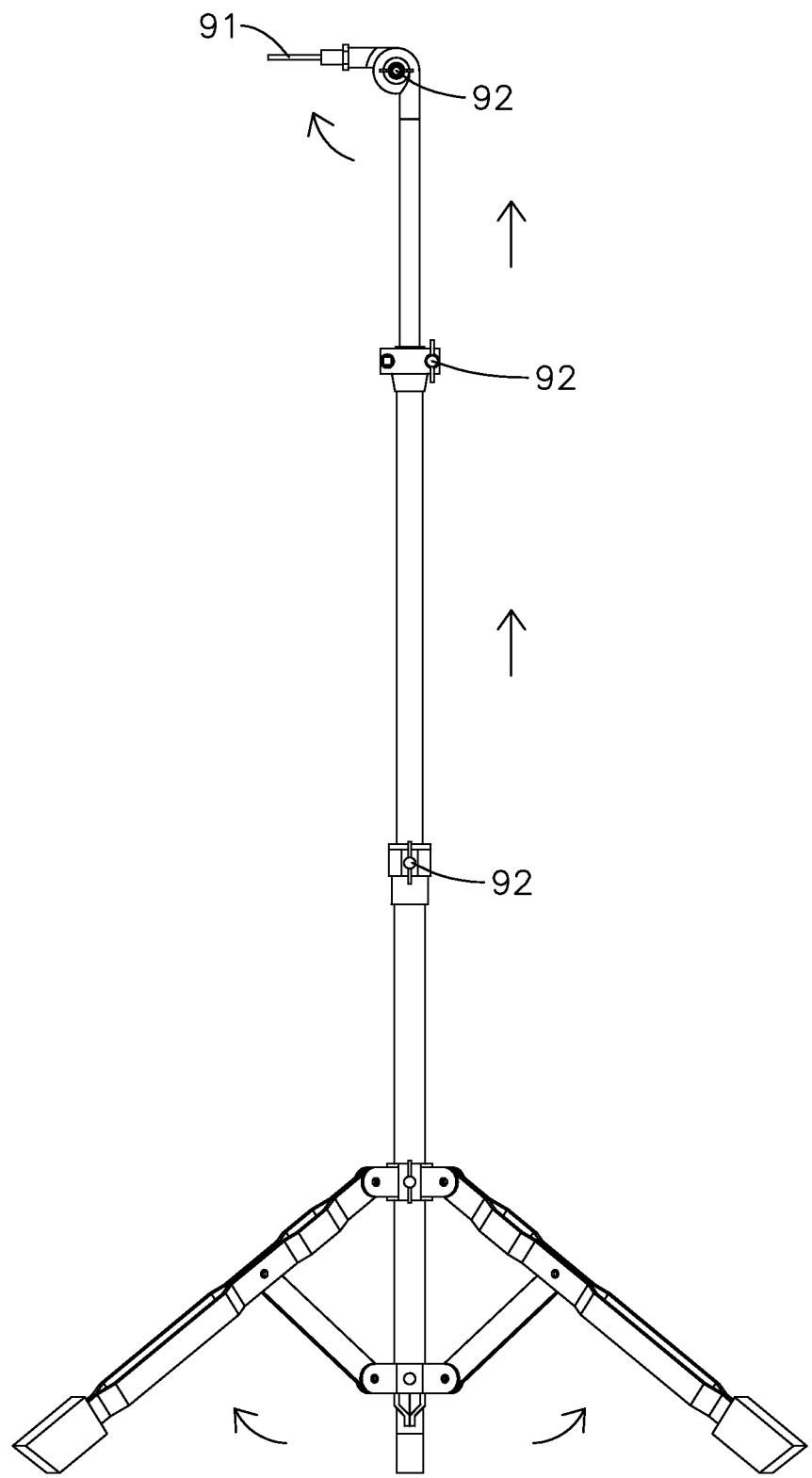

With reference to FIG. 13, a third embodiment in accordance with the present invention is substantially similar to the first embodiment, but the difference is that the distal clamping plate 32 is omitted. The manual abutting portion of the manual operating member 52B and the shaft abutting portion of the locking shaft 51B are configured to clamp the boom-connecting tube 40B, the proximal clamping plate 31B and the connecting seat 20B therebetween into the locked condition.

In the locked condition, the seat positioning portion of the tripod-connecting member is clamped between an inner surface of the connecting seat 20B and the proximal positioning portion of the proximal clamping plate 31B to prevent the connecting seat 20B from rotating relative to the tripod-connecting member.

In summary, by mounting the locking shaft 51 through the boom-connecting tube 40, the distal clamping plate 32, and the connecting seat 20, and then connect the locking shaft 51 to the manual operating member 52, the manual operating member 52 is capable of making all positioning portions of the boom-connecting tube 40, the distal clamping plate 32, the connecting seat 20, and the tripod-connecting member 10 engage or disengage simultaneously. As a result, the user can adjust the position of the device mounted on the stand in three directions simultaneously via the manual operating member 52 for ease of use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stand adjustment device, configured to be assembled into a stand with a tripod and a boom; the stand adjustment device comprising:
   a tripod-connecting member being cylindrical and configured to be connected to the tripod, the tripod-connecting member having:
      a seat positioning portion formed around an outer annular surface of the tripod-connecting member;
   a connecting seat rotatably located around the seat positioning portion of the tripod-connecting member and having:
      a first side and a second side disposed opposite each other;

a proximal clamping plate detachably attached to the first side of the connecting seat and having
a first lateral surface facing toward the connecting seat;
a second lateral surface facing away from the connecting seat;
a proximal positioning portion formed on the first lateral surface;
the proximal positioning portion detachably abutting against the seat positioning portion of the tripod-connecting member;
an inner positioning portion formed on the second lateral surface;
a distal clamping plate detachably attached to the second side of the connecting seat and having
a distal positioning portion formed on a surface, which faces toward the connecting seat, of the distal clamping plate; the distal positioning portion detachably abutting against the seat positioning portion of the tripod-connecting member;
a boom-connecting tube detachably attached to the proximal clamping plate and being rotatable relative to the connecting seat; a rotating axis of the boom-connecting tube relative to the connecting seat being non-parallel to a rotating axis of the connecting seat relative to the tripod-connecting member; the boom-connecting tube having:
two outer clamping holes each formed through a respective one of two opposite sides of the boom-connecting tube;
an outer positioning portion disposed on a side, which faces toward the connecting seat, of the boom-connecting tube; the outer positioning portion detachably engaging with the inner positioning portion of the proximal clamping plate;
a locking shaft slidably and sequentially mounted through the boom-connecting tube, the proximal clamping plate, the connecting seat, and the distal clamping plate such that the boom-connecting tube is rotatable relative to the connecting seat; the locking shaft having:
a first end and a second end disposed opposite each other;
a shaft abutting portion formed on the first end; the shaft abutting portion movably disposed in the boom-connecting tube;
an inner clamping hole formed through the shaft abutting portion; the boom slidably mounted through the two outer clamping holes of the boom-connecting tube and the inner clamping hole of the locking shaft; and
a manual operating member connected to the second end of the locking shaft and having
a manual abutting portion configured to move toward or away from the shaft abutting portion of the locking shaft; the manual abutting portion of the manual operating member and the shaft abutting portion of the locking shaft configured to clamp the boom-connecting tube, the proximal clamping plate, the connecting seat, and the distal clamping plate therebetween into a locked condition;
wherein
in the locked condition, a wall of the inner clamping hole of the locking shaft abuts against a far side of the boom, and walls of the two outer clamping holes of the boom-connecting tube abut against a near side of the boom to prevent the boom from sliding relative to the boom-connecting tube;

in the locked condition, the outer positioning portion of the boom-connecting tube engages with the inner positioning portion of the proximal clamping plate to prevent the boom-connecting tube from rotating relative to the connecting seat;
in the locked condition, the seat positioning portion of the tripod-connecting member is clamped between the proximal positioning portion of the proximal clamping plate and the distal positioning portion of the distal clamping plate to prevent the connecting seat from rotating relative to the tripod-connecting member.

2. The stand adjustment device as claimed in claim 1, wherein
the outer positioning portion of the boom-connecting tube comprises multiple outer positioning gears arranged around the locking shaft;
the inner positioning portion of the proximal clamping plate comprises multiple inner positioning gears arranged around the locking shaft; and
the inner positioning gears detachably engage with the outer positioning gears.

3. The stand adjustment device as claimed in claim 1, wherein
the seat positioning portion of the tripod-connecting member comprises multiple seat positioning gears arranged around the outer annular surface of the tripod-connecting member;
the proximal positioning portion of the proximal clamping plate comprises multiple proximal positioning gears arranged along a curve;
the distal positioning portion of the distal clamping plate comprises multiple distal positioning gears arranged along a curve; and
the proximal positioning gears and the distal positioning gears detachably engage with the seat positioning gears.

4. The stand adjustment device as claimed in claim 1, wherein
an outer contour of the shaft abutting portion of the locking shaft is non-circular; and
an inner surface of the boom-connecting tube corresponds in shape to the outer contour of the shaft abutting portion to prevent the locking shaft from rotating relative to the boom-connecting tube.

5. The stand adjustment device as claimed in claim 1 comprising:
a proximal resilient member disposed between the connecting seat and the proximal clamping plate such that the connecting seat and the proximal clamping plate are configured to move away from each other; and
a distal resilient member disposed between the connecting seat and the distal clamping plate such that the connecting seat and the distal clamping plate are configured to move away from each other.

6. The stand adjustment device as claimed in claim 1 comprising a tube resilient member disposed between the boom-connecting tube and the proximal clamping plate such that the boom-connecting tube and the proximal clamping plate are configured to move away from each other.

7. The stand adjustment device as claimed in claim 1, wherein an expansion hole is formed in a top surface of the connecting seat; an internal thread is formed in the expansion hole.

8. The stand adjustment device as claimed in claim 7, wherein the connecting seat has an expansion pole having:
a fixed end screwed into the expansion hole; and an expansion end disposed opposite to the fixed end and protruding from the connecting seat; an external thread is formed on the expansion end.

\* \* \* \* \*